United States Patent
Liu et al.

(10) Patent No.: US 9,762,737 B1
(45) Date of Patent: Sep. 12, 2017

(54) IPBX CONTROL INTERFACE FOR DISTRIBUTED NETWORKS

(71) Applicant: 8×8, Inc., San Jose, CA (US)

(72) Inventors: Zhishen Liu, San Jose, CA (US); Bryan R. Martin, San Jose, CA (US)

(73) Assignee: 8×8, Inc., San Jose, CA (US)

( * ) Notice: Subject to any disclaimer, the term of this patent is extended or adjusted under 35 U.S.C. 154(b) by 146 days.

(21) Appl. No.: 14/670,174

(22) Filed: Mar. 26, 2015

Related U.S. Application Data

(62) Division of application No. 14/661,902, filed on Mar. 18, 2015.

(60) Provisional application No. 62/134,474, filed on Mar. 17, 2015.

(51) Int. Cl.
*H04M 7/00* (2006.01)
*H04M 7/12* (2006.01)

(52) U.S. Cl.
CPC ......... *H04M 7/0006* (2013.01); *H04M 7/009* (2013.01); *H04M 7/0033* (2013.01); *H04M 7/0042* (2013.01); *H04M 7/128* (2013.01)

(58) Field of Classification Search
CPC .................................................. H04M 7/0006
See application file for complete search history.

(56) References Cited

U.S. PATENT DOCUMENTS

| | | | |
|---|---|---|---|
| 6,185,194 B1 * | 2/2001 | Musk | H04L 29/06 370/260 |
| 6,622,016 B1 * | 9/2003 | Sladek | H04Q 3/0054 379/201.01 |
| 6,782,080 B2 | 8/2004 | Leivo et al. | |
| 7,072,653 B1 * | 7/2006 | Sladek | H04L 67/303 455/432.3 |
| 7,647,041 B2 * | 1/2010 | Gonsalves | H04W 8/22 370/328 |

(Continued)

FOREIGN PATENT DOCUMENTS

WO 2008089522 A1 7/2008

OTHER PUBLICATIONS

Gerry Blackwell, "Jajah: Free VoIP with a Twist," www.voipplanet.com (Oct. 5, 2006).

(Continued)

*Primary Examiner* — Parth Patel
(74) *Attorney, Agent, or Firm* — Crawford Maunu PLLC

(57) ABSTRACT

Apparatus and methods concerning routing of calls in an IPBX are disclosed. As an example, one apparatus includes an IPBX server configured to route VoIP calls for a plurality of end-users having respective VoIP-enabled devices communicatively coupled to the IPBX via a network. A user-activity detection circuit is communicatively coupled to the IPBX server. The user-activity detection circuit is configured to receive activity data indicating activity of end-users in a virtual office environment and receive event messages indicating statuses of pending calls in the IPBX server. The user-activity detection circuit determines user-activity statuses of the end-users based on received activity data and event messages. A computing server is communicatively coupled to the user-activity detection circuit and is configured to provide a set of services for one or more of the plurality of users as a function of the determined user-activity statuses of the end-user.

20 Claims, 9 Drawing Sheets

(56) References Cited

U.S. PATENT DOCUMENTS

| | | | |
|---|---|---|---|
| 8,300,634 B2 | 10/2012 | Narayanaswamy | |
| 9,025,756 B1* | 5/2015 | Graham | H04M 3/523 379/265.02 |
| 9,432,519 B1* | 8/2016 | Liu | H04M 15/56 |
| 2002/0077158 A1* | 6/2002 | Scott | H04M 1/663 455/567 |
| 2004/0072593 A1* | 4/2004 | Robbins | H04M 3/42314 455/560 |
| 2004/0160946 A1* | 8/2004 | Fowler | H04L 29/06027 370/352 |
| 2004/0198461 A1* | 10/2004 | Coombes | H04M 1/642 455/567 |
| 2004/0228469 A1* | 11/2004 | Andrews | H04L 65/1069 379/265.03 |
| 2004/0266426 A1* | 12/2004 | Marsh | H04W 36/0066 455/426.2 |
| 2005/0201304 A1* | 9/2005 | Olshansky | H04L 69/08 370/282 |
| 2006/0025141 A1* | 2/2006 | Marsh | H04W 36/0066 455/445 |
| 2006/0027648 A1* | 2/2006 | Cheah | G06Q 10/06 235/381 |
| 2006/0258335 A1* | 11/2006 | Yeh | H04W 4/12 455/413 |
| 2007/0092073 A1* | 4/2007 | Olshansky | H04M 3/42323 379/232 |
| 2007/0186002 A1* | 8/2007 | Campbell | H04N 7/142 709/231 |
| 2007/0192418 A1* | 8/2007 | Adams | H04L 12/58 709/206 |
| 2008/0118041 A1 | 5/2008 | Finogenov | |
| 2009/0023450 A1* | 1/2009 | George | H04L 12/66 455/442 |
| 2009/0221265 A1 | 9/2009 | Liu et al. | |
| 2009/0271283 A1* | 10/2009 | Fosnacht | G06Q 20/123 705/26.1 |
| 2010/0146583 A1* | 6/2010 | Prehofer | G06Q 30/02 726/1 |
| 2010/0197288 A1 | 8/2010 | Camilleri et al. | |
| 2010/0216509 A1* | 8/2010 | Riemer | H04M 1/72577 455/557 |
| 2012/0083287 A1* | 4/2012 | Casto | H04W 4/14 455/456.1 |
| 2012/0281702 A1* | 11/2012 | Qiu | H04L 45/22 370/392 |
| 2013/0059598 A1* | 3/2013 | Miyagi | H04W 4/023 455/456.1 |
| 2013/0157629 A1* | 6/2013 | Lee | H04W 4/16 455/414.1 |
| 2013/0189963 A1* | 7/2013 | Epp | H04M 1/64 455/414.1 |
| 2013/0194976 A1* | 8/2013 | Choi | H04L 12/66 370/259 |
| 2013/0258373 A1* | 10/2013 | Ming | H04N 1/32016 358/1.13 |
| 2014/0342723 A1* | 11/2014 | Rogers | H04L 1/08 455/419 |
| 2015/0156075 A1* | 6/2015 | Gist | G06Q 10/06 709/201 |
| 2016/0055504 A1* | 2/2016 | Murray | G06Q 30/0205 705/7.34 |
| 2016/0227033 A1* | 8/2016 | Song | H04M 3/432 |

OTHER PUBLICATIONS

Jeff Goldman, "TalkPlus: a PBX for Mobil Phones," www.voipplanet.com (Aug. 16, 2007).

* cited by examiner

IPBX CONTROL INTERFACE FOR DISTRIBUTED NETWORKS

OVERVIEW

A private branch exchange (PBX) routes calls between a service provider network (e.g., a cellular network or a public standard telephone network (PSTN)) and a plurality of end-users having respective telephone extensions in a private telecommunication network. One type of PBX, known as an Internet Protocol PBX (IPBX), routes calls between a service provider network and a plurality of Voice over Internet Protocol (VoIP)-enabled devices on an IP network using VoIP, in which each device is assigned a respective telephone extension.

SUMMARY

Apparatus and methods concerning routing of calls in an IPBX are disclosed. In one example, an apparatus includes an IPBX server configured to route VoIP calls for a plurality of end-users having respective VoIP-enabled devices communicatively coupled to the IPBX via a network.

A presence (e.g., user-activity and/or user-availability) detection circuit is communicatively coupled to the IPBX server. The presence detection circuit is configured to receive activity data indicating activity of end-users in a software platform that provides user-services to the end-users. The presence detection circuit also receives event messages indicating statuses of pending calls in the IPBX server. The software platform may provide various user services in a virtual office environment including, for example, virtual desktops, word processing, scheduling service, transcription services, and/or online conferences and file sharing. A virtual office environment can provide a number of different services to end users. An example of a virtual office environment is provided by 8×8 Virtual Office™, which is described at www.8x8.com and in patent application Ser. No. 14/546,026, Virtual Data Centers, each of which are fully-incorporated herein by reference.

The presence detection circuit determines presence statuses (e.g., user-activity status) of the end-users based on received activity data and event messages. A computing server is communicatively coupled to the presence detection circuit and is configured to receive the determined presence statuses of the end-users and provide a set of services for one or more of the end-users as a function of the determined presence statuses of the end-users.

As another example, an apparatus includes an IPBX server having a call routing circuit configured to route calls for a plurality of switchboard interfaces. Each switchboard interface corresponds to a VoIP-enabled device of a respective receptionist. The IPBX also includes a call control circuit coupled to the call routing circuit. In response to a subscription request from a switchboard interface, the call control circuit initiates a new subscription for the switchboard interface. In response to a change in a status of a call of one of the switchboard interfaces, the call control circuit provides an event message indicating a status of the pending call to the switchboard interface. In further response to the subscription request from the switchboard interface, the call control server identifies any pending calls for the switchboard interface (e.g., from a previous subscription that was disconnected). For each of the identified pending calls, the call control server communicates pseudo-event message indicating a status of the pending call to the switchboard interface.

BRIEF DESCRIPTION OF THE FIGURES

The disclosure may be more completely understood in consideration of the following detailed description of various embodiments of the disclosure, in connection with the accompanying drawings in which.

Figure 1:
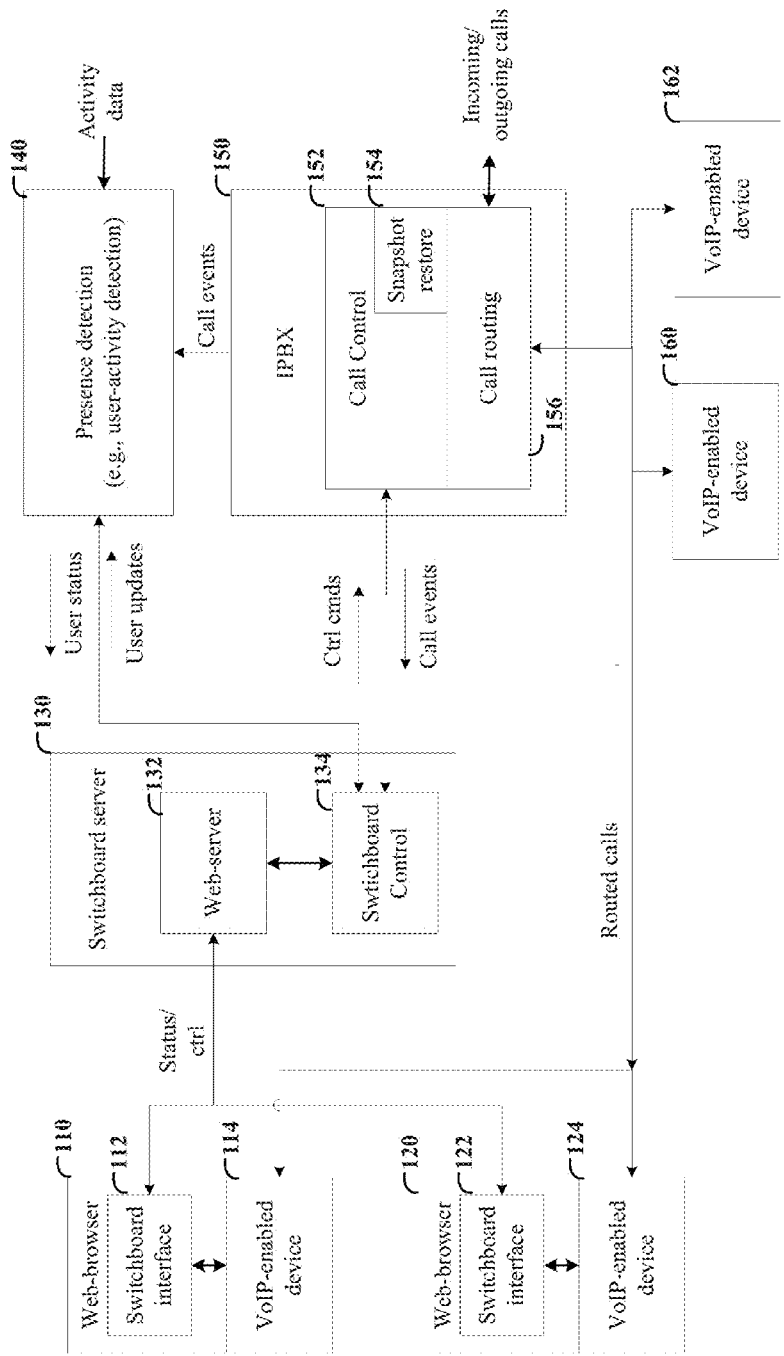
FIG. 1 shows an example communication system having an IPBX configured in accordance with one or more embodiments.

While various embodiments are amenable to various modifications and alternative forms, specifics thereof have been shown by way of example in the drawings and will be described in detail. It should be understood, however, that the intention is not to limit the disclosure to the particular examples and embodiments described. On the contrary, the intention is to cover all modifications, equivalents, and alternatives falling within the spirit and scope of the disclosure.

DESCRIPTION

Aspects of the present disclosure are believed to be applicable to a variety of different types of apparatuses, systems and methods utilizing an IPBX server to provide communication services for a plurality of end-users in a network. In some implementations, aspects of the present disclosure have been shown to be beneficial when used in the context of routing of communication in a IPBX by remote receptions via a web-based interface.

While the disclosed embodiments are not necessarily limited to such applications, various aspects of the present disclosure may be appreciated through a discussion of various examples using this context.

In some applications, an IPBX may include a switchboard extension from which one or more receptionist may answer and direct incoming calls. In some embodiments, receptionists may be communicatively connected to the IPBX from a remote location via web-based switchboard interface. For instance, a receptionist may load the web-based switchboard interface in a web-browser by directing the web-browser to a switchboard server coupled to the IPBX. In various implementations, the switchboard interface displays a status of pending calls routed to the receptionist of the IPBX and provides various options for directing the call including, for example, answering, hanging-up, redirecting, placing on hold, and/or parking calls.

According to embodiments, the switchboard server can be configured to respond to call state notification events received from the IPBX. These events can be generated in response to subscriptions initiated by the switchboard server in response to access requests originating from the web-based switchboard interfaces. In some embodiments, the subscription requests can be implemented using a protocol that requests current state and state updates from a remote node, such as Computer Telephony Integration (CTI) and Session-Initiation-Protocol (SIP) subscribe requests. In certain instances, the web-based switchboard interfaces can be configured to display information relating to past events including, but not limited to, call transfer history, length of call status, prior call status information (e.g., time on hold), call parking information, and combinations thereof. The subscribe requests can be configured to identify nodes for which switchboard server is providing the status to one or more active web-based switchboard interfaces.

Consistent with embodiments, the subscriptions can expire after a period of time and may be terminated upon the loss of an active connection from a corresponding web-based switchboard interface. Moreover, the historical tracking of at least some status-based data can be maintained at the user computer (circuit) device that is providing the web-based switchboard interfaces. Aspects of the present disclosure recognize that it can be desirable to provide information relating to the historical status-based data for a new connection. For example, a user of the web-based switchboard interfaces may navigate away from the web-based interface (e.g., by hitting the back or refresh buttons of the web-browser), close a window, or may not have had a recently-active connection (e.g., accessing the switchboard interface for the first time in the morning). The past statuses may be lost (e.g., in the case of navigating away), or simply not present (e.g., in the case of no recently-active connection).

When the web-based switchboard interface is reloaded, it is difficult to determine the status of pending calls for the switchboard interface. For instance, a status update transmitted by the IPBX for a pending call may have been missed while the switchboard interface for the user was not in operation. In one or more embodiments, each switchboard interface is configured to connect to the IPBX by establishing a call control subscription. For the duration of a call control subscription initiated by a switchboard interface, the IPBX provides event messages indicating changes in status of pending calls for the switchboard interface. The switchboard interface provides call control commands to the IPBX via the call control subscription to direct the IPBX to perform various call-related actions selected by a receptionist. The call-related actions may include, for example, answering, hanging-up, redirecting, placing on hold, and/or parking of a pending call.

In response to receiving a call control command from a connected switchboard interface, the IPBX performs the requested call related action, and communicates an event message back to the switchboard interface. The event message serves to acknowledge receipt of the call control command and to prompt the switchboard interface to update the status of the call. When a new call control subscription is initiated by a switchboard interface, the IPBX determines whether or not there are pending calls for the receptionist. In some instances, the new subscription could correspond to a previous call-control subscription that was disconnected. For ease of explanation, pending calls of the receptionist may be refer to as pending calls of the switchboard interface for the receptionist. If pending calls are identified, the IPBX communicates pseudo-event messages, which indicate statuses of the pending calls, to the switchboard interface for the receptionist. Similar to the event messages, the pseudo-event messages prompt the switchboard interface for the receptionist to display the pending calls with status indicated by the pseudo-event messages.

Consistent with embodiments, the pseudo-event messages can be regenerated events corresponding to historical events. For example, a call transfer event can be recreated for a pending call that was transferred before the new subscription was established. The switchboard server can receive the regenerated event from the IPBX and then provide status information to the switchboard interface. This can be particularly useful for presenting historical call status information in connection with a new subscription for a switchboard interface.

Consistent with various embodiments, the pseudo-event messages can be dynamically generated in response to nodes identified in a subscription request. For example, the IPBX can identify node(s) corresponding to a subscription request. The IPBX can then check the call status for the identified nodes in order to determine whether to generate pseudo-event messages that can be used to recreate historical status information. This can be particularly useful for providing historical status information without separately storing the historical events, as the pseudo-event messages can be dynamically generated in response to a subscription request.

In some embodiments, a presence (or activity) detection circuit is communicatively coupled to the IPBX server. The presence detection circuit receives activity data indicating activity of end-users relative to a software platform (or a "computing platform") that provides various services available over a networked environment (e.g., a virtual office environment). Examples of activity data can include input/requests in network applications (such as a virtual office environment) that is indicative that a user is active on the network. Some examples of activities can include a user checking/sending email by an end-user, use of scheduling application by an end-user, use of a video conferencing application by an end-user, retrieving files from a file server by the end-user, and an active virtual desktop session of the end-user.

In particular embodiments, the software platform can be configured to allow users to access features through a web-based portal. For instance, a user can access the software platform through a webserver that allows for access using a web browser application. The webserver can communicate status information, for users that are accessing the software platform, to the presence detection circuit. For example, the webserver can use a protocol such as Extensible Messaging and Presence Protocol (XMPP) for providing the status information.

The presence detection circuit also receives event messages indicating statuses of pending calls in the IPBX server. For example, the presence detection circuit can be configured to receive call state notification events from the IPBX. The particular call state notifications events received from the IPBX can be responsive to subscription requests. In certain embodiments, the subscription requests can be generated in response to requests from a switchboard server. The presence detection circuit can be configured to use both activity data from the software platform and event messages from the IPBX to determine statuses for end users corresponding to the subscription requests. The presence status of an end-user may have various states including, for example, in telephone call, in meeting, available, unavailable, out of office, away from desk, on call. In this manner, the presence status can reflect information from both the IPBX and the software platform. The determined presence statuses may be used by various network applications to adjust services provided to the end-users.

In some implementations, the switchboard interface is configured to display statues of end-users included in a directory of the IPBX. In some examples, each receptionist and/or end-user may have a respective directory of contacts. In some implementations, a directory of a receptionist may include a set of public contacts and a set of private contacts. The public contacts are accessible by all end-users/receptionists in the network, whereas private contacts are exclusive to one of the users/receptionists. In some implementations, the switchboard interface may also display other user information including, for example, names, department, location, local time, and/or an extension number.

In some embodiments, the switchboard interface may provide multiple communication channels for a directing communications in the network. The communication channels may be configured to communicate various types of messages including for example, voice calls, voicemail, short-message-service (SMS) messaging, instant messaging, memos, and/or email. Communications may be directed to individual end-users or to a group of end-users.

For ease of explanation, the examples are primarily described with reference to an IPBX. However, the embodiments are not so limited. Rather, some disclosed aspects may be applicable to a variety of methods, systems, and apparatuses for routing of calls. For example, a conventional PBX may be adapted to place outgoing calls from mobile devices via the PBX, as discussed above.

Turning now to the figures, FIG. 1 shows an example communication system having an IPBX configured in accordance with one or more embodiments. The IPBX server 150 includes a call routing circuit 156 configured to route VoIP calls for VoIP-enabled devices 114, 124, 160 and 162 communicatively coupled to the IPBX server 150 via a network. Each of the VoIP enabled devices corresponds to a respective end-user or call receptionist in the IPBX.

As previously described, call receptionists may receive and redirect calls from the IPBX server 150 via respective switchboard interfaces 112 and 122. The IPBX server 150 includes a call control circuit 152 configured to direct routing of calls by the call routing circuit 156 responsive to the switchboard interfaces 112 and 122. In response to receiving a subscription request from a switchboard interface (e.g., 112) of a receptionist, the call control circuit 152 initiates a new subscription for the switchboard interface. While the subscription is active, the call control circuit 152 provides event messages to the switchboard interface to indicate changes in statuses of the pending calls for the switchboard interface. The switchboard interface provides call control commands to the IPBX to prompt the IPBX to perform various call-related actions selected by a receptionist. In response to a receiving a call control command from a switchboard interface 112 or 122, the call control circuit 152 directs the call routing circuit 156 to perform the requested call related action. The call control circuit 152 then communicates an event message back to the switchboard interface. The event message serves to acknowledge receipt of the call control command and to prompt the switchboard interface 112 or 122 to update the status of the call.

As previously described, if a switchboard interface is inadvertently reset, the statuses of pending calls may be lost or rendered incorrect. In some implementations, the call control circuit 152 includes a snapshot restore circuit 154 configured to restore statuses of pending calls at the switchboard interface. When a new subscription is requested by a switchboard interface, calls from a previous subscription may still be pending for the switchboard interface. At the start of the new subscription, the snapshot restore circuit 154 identifies any pending calls for the switchboard interface. For each of the identified pending calls, the snapshot restore circuit 154 communicates a pseudo-event message to the switchboard interface that indicates the current status of the call, thereby prompting the switchboard interface to restore the status of the call.

In this example, the snapshot restore circuitry 154 is included in the call control circuit 152 of the IPBX server 150. In some embodiments, the snapshot restore circuitry 154 may be located external to the IPBX and connected to monitor event messages and subscription requests. The external snapshot restore circuit may maintain status information for pending calls in the IPBX server 150 based on the observed call event messages. In response to observing a subscription request communicated to the IPBX from a switchboard interface, the external snapshot restore circuit may communicate pseudo-event messages to the switchboard interface to restore statuses of pending calls. For ease of explanation, the examples are primarily described with reference to a call control circuit 152 including a snapshot restore circuit 154.

In the example shown in FIG. 1, switchboard interfaces 112 and 122 are web-based interfaces communicatively connected to the IPBX via a switchboard server 130. The switchboard server includes a web-server configured to host switchboard interfaces for a plurality of receptionists. For instance, a receptionist may load the switchboard interface 112 or 122 in a web-browser 110 or 120 by directing the web-browser to an address of the web-server 132.

In this example, the switchboard server 130 includes a switchboard control circuit 134 configured to establish call control subscriptions with the IPBX for switchboard interfaces connected to the web-server 132. The switchboard control circuit 134 communicates control commands received from the switchboard interfaces 112 and 122 via the web-server to the IPBX server 150. The switchboard control circuit 134 receives event messages for pending calls from the IPBX server 150 and communicates the event messages to appropriate ones of the switchboard interfaces 112 and 122.

In some embodiments, the switchboard control circuit 134 is configured to receive presence statuses of end-users in the IPBX network. Presences status of an end-user may include, for example, unavailable, on telephone, in meeting, available, away from desk, out of office, on-call. In some implementations, the switchboard interfaces are configured to display presence statuses of end-users in a directory used by the receptionist. A receptionist can use the presence statuses, for example to identify available persons available to receive incoming calls.

In the example, shown in FIG. 1, the system includes a presence detection circuit 140 communicatively coupled to the IPBX server. A presence detection circuit 140 is communicatively coupled to the IPBX server 150. The presence detection circuit 140 is configured to receive activity data indicating activity of end-users in a virtual office environment and receive event messages indicating statuses of pending calls in the IPBX server 150. The presence detection circuit 140 determines presence statuses of the end-users based on received activity data and event messages. An example process for determining presence status of end-users is discussed in more detail with reference to FIG. 9.

The presence statuses of end-users may be used by various network applications that provide services for the end-users. For example, as previously described, a switchboard interfaces may be configured to display presence statuses of end-users in a directory used by the receptionist. As another example, the presence status of end-users may be used by a scheduling application to determine available time for meetings between a number of participants. As another example, presence statuses of end-users may be used to coordinate operations between multiple messaging services in a virtual office environment.

Figure 2:
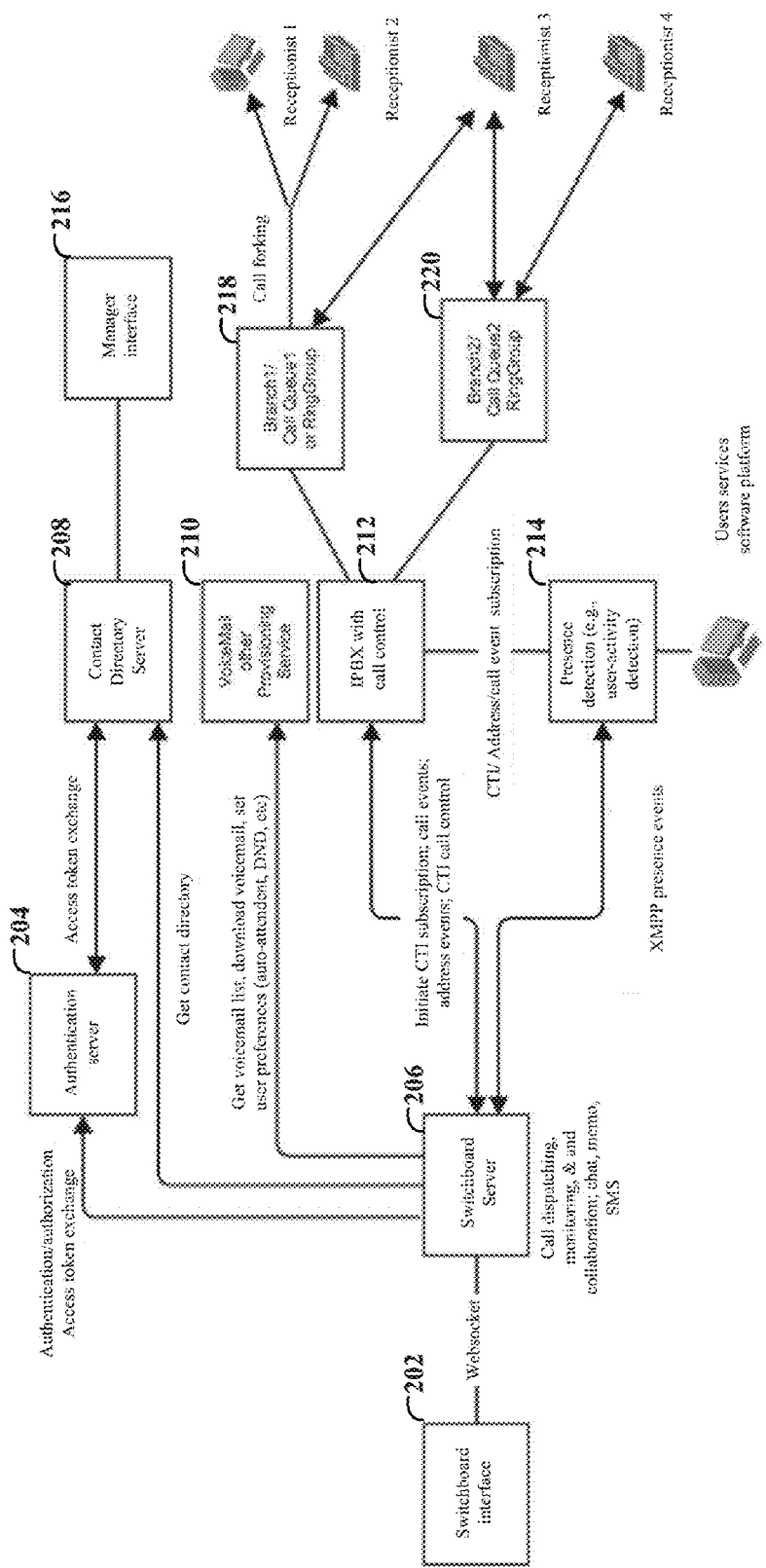
FIG. 2 shows a second example communication system having an IPBX configured in accordance with one or more embodiments.

FIG. 2 shows a second example communication system having an IPBX server configured in accordance with one or more embodiments. The system includes an IPBX server 212, presence detection circuit 214, switchboard server 206, and switchboard interface 202, for example, as described with reference to an IPBX server 150, presence detection circuit 140, switchboard server 130, and switchboard interface 112 in FIG. 1. The IPBX server 212 is configured to route calls for a plurality of end-users having respective extensions. The switchboard interface 202 may be used by a receptionist to direct the routing of calls for the receptionist in the IPBX server 212. The switchboard interface 202 is connected to the IPBX via the switchboard server 206. As described with reference to switchboard server 130 in FIG. 1, the switchboard server 206 may be configured to host connections for a plurality of remote switchboard interfaces connected to the switchboard server via a network connection. A receptionist may load the switchboard interface 202 in a web-browser by directing the web-browser to a web address of the switchboard server.

Using the switchboard interface 202, the receptionist may log into the switchboard server 206 and initiate a call control subscription with the IPBX 212 via the switchboard server 206. The call control subscription may be established, for example, by communicating a computer-telephony-integration (CTI) subscription request to the IPBX 212. While the call control subscription is active, IPBX 212 communicates event messages to the switchboard interface 202 to alert the switchboard interface 202 of changes in the statuses of pending calls for the switchboard interface 202. The switchboard interface 202 directs the IPBX 212 to perform various call related actions by communicating call control messages (e.g., via CTI messages) to the IPBX 212 via the switchboard server 206. In response to the call control message, the IPBX 212 performs the requested action and communicates call events to each switchboard interface 202 for which the call may be pending. The switchboard server 206 communicates subscription requests and control commands received from the switchboard interface 202 to the IPBX server 212. The switchboard server 206 communicates call events for pending calls of the switchboard interface 202 from the IPBX server 212 to the switchboard interface 202.

As previously described, if the switchboard interface 202 is inadvertently reset, the statuses of pending calls may be lost or rendered incorrect. When a call control subscription, is established, the IPBX 212 identifies pending calls for the switchboard interface 202, and communicates pseudo-event messages for the pending calls to the switchboard interface 202. The pseudo-event messages prompt the switchboard interface 202 to restore the statuses of the pending calls.

In some implementations, the IPBX server 212 also generates address events to indicate when a user or extension is added or removed from the IPBX. The presence detection circuit 214 is configured to determine presence statuses of the end-users based on call and address events produced by the IPBX 212 and activity of the end-users in a network application (e.g., in a virtual office environment). In some implementations, end-users and/or receptionist may manually update a presence status of the user with the presence detection circuit using various interfaces in the network (e.g., the switchboard interface).

In this example, the presence detection circuit 214 communicates presence events (e.g. Extensible Messaging and Presence Protocol (XMPP) presence events), indicating changes in the presence statuses of the end-users to the switchboard server 206. The presence detection circuit 214 may provide presence events for all detected end-users or only for specified end-users. For example, the switchboard interface 202 may be configured to display presence statuses of end-users in a respective contact list of the switchboard interface 202. In some implementation, a presence subscription may be set up with the presence detection circuit for each connected switchboard interface 202. The presence subscription indicates end-users for which presence events should be generated. In some other implementations, the switchboard server 206 receives presence events for all of the end-users and provides each presence event to connected switchboard interfaces having the end-user in the contact directory for the switchboard interface. The directories may include public contacts accessible by all end-users/receptionists in the network and/or private contacts exclusive to one of the users/receptionists. Directories may be stored in a contact directory server 208 and retrieved by the switchboard server 206 when receptionist logs into the into the switchboard server. Entries in the directories may be adjusted using various interfaces in the network including, for example, the switchboard interface, end-user applications (e.g., virtual office applications), or a manager interface 216.

The system may include various servers and circuits that provide various support services. In this example, the system includes an authentication server 204 that may be used to authenticate users and permissions for various servers or applications in the system. For instance, when a receptionist logs into the switchboard server 206, switchboard server 206 may authenticate the receptionist using the authentication server. In some implementations, the authentication server may retrieve and provide user settings or respective directory for the receptionist as part of the logging process.

In some embodiments, a receptionist may utilize multiple communication channels directing communications in the network. The communication channels may be configured to communicate various types of messages including for example, voice calls, voicemail, SMS messaging, instant messaging, and/or memos. As one example, voice calls routed to a receptionist may be answered, placed on hold, parked in a call queue, or transferred to an end-user extension or to voice mail service 210. As another example, non-voice messages and/or voicemail may be transferred to an end-user displayed in a directory of the receptionist using a drag and drop interface. Communications may be directed to individual end-users or to a group of end-users.

The switchboard interface may be configured to receive and direct calls from various numbers of extensions. In different embodiments, receptionists may receive and direct calls from various numbers of extensions. In some implementations, each receptionist may receive a call from a respective extension. In some other implementations, an extension may be shared by multiple receptionists in a call queue or ring group 218 and 220. Furthermore, a receptionist may receive calls from multiple call queues or ring groups.

In some embodiments, the switchboard interface is configured to provide multiple calls to receptionist calls at a time, thereby allowing the receptionist to manage multiple calls on hold. In some embodiments, the maximum number of calls provided to the corresponding receptionist at a time may be adjusted via the switchboard interface 202. If the receptionist receives calls from a call queue or ring group 218 and 220, call queue or ring group 218 and 220 may monitor the number of pending calls or a receptionist in order to determine when a new call should be distributed to the receptionist. A call queue may ring all receptionists for the call queue simultaneously or may ring the receptionist sequentially based on call distribution pattern. Each receptionist may choose to answer a call with a click and view calls being answered by other receptionist.

In some implementations, the switchboard server may be communicatively coupled to multiple IPBX servers for directing routing of calls between multiple geographically distributed branch locations. To facilitate directing of calls in multiple geographic locations, in some implementations, the switchboard interface may display location and local time of end-users in the directory. The switchboard interface may also display information for the incoming caller including, for example, caller identification, geographic location, local time, local language(s), etc.

In some embodiments, the switchboard interface 202 may provide various automated features that may be configured by the receptionist. As one example, a receptionist may configure the switchboard to automatically perform specific call related actions in user-defined scenarios. For instance, the switchboard interface 202 may be configured to forward calls to voicemail or an automated call attendant menu if a call is unanswered or remains on hold or parked for a threshold period of time. Performance of call related actions may be additionally or alternatively, the based status of a receptionist. As another example, the switchboard interface 202 may be configured to automatically answer calls when auto-answer mode is enabled. When the auto-answer mode is disabled, an incoming call must be manually answered by a receptionist, for example, with click to answer. When the auto-answer mode is enabled, an incoming call will automatically be answered and an audible alert is provided to the receptionist.

Figure 3:
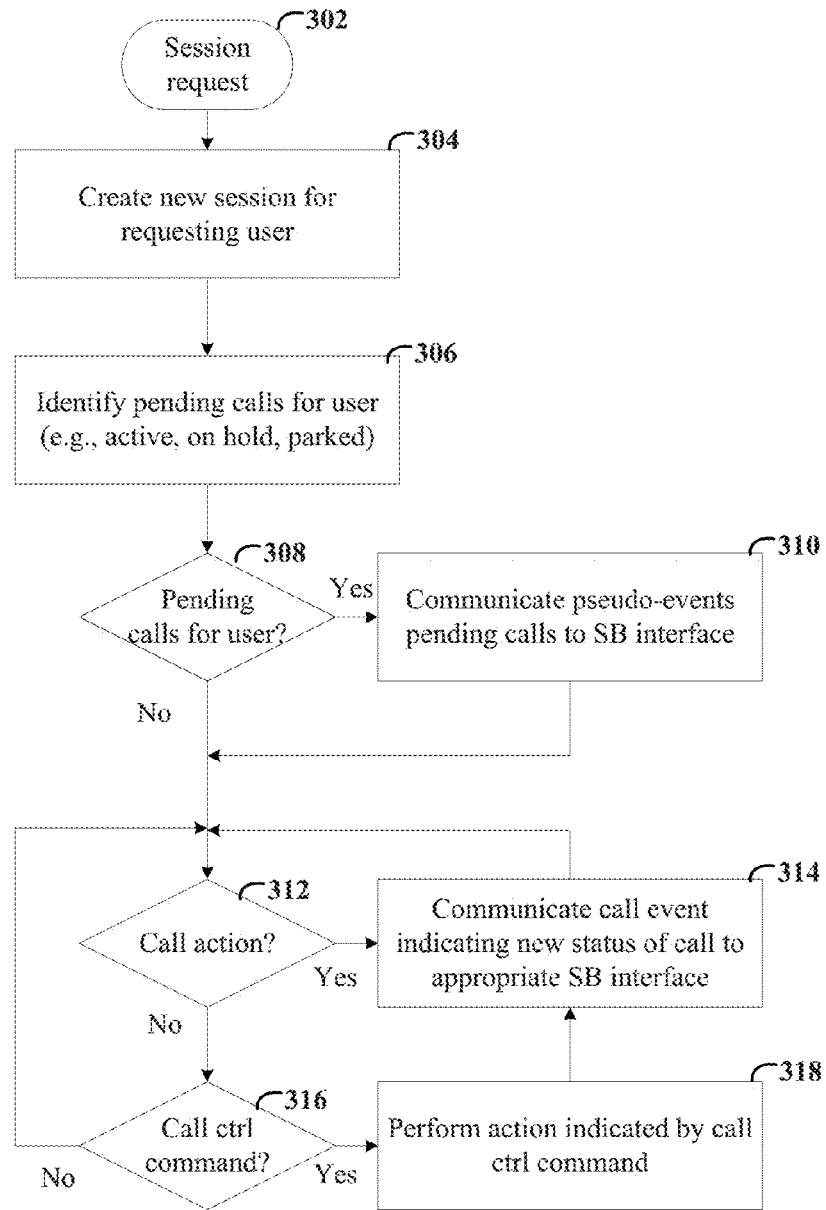
FIG. 3 shows an example process for providing status of calls in an IPBX to switchboard interfaces; consistent with one or more embodiments.

FIG. 3 shows an example process for providing status of calls in an IPBX to switchboard interfaces; consistent with one or more embodiments. In response to receiving a call subscription request 302 for a switchboard interface, a subscription is created for the switchboard interface at block 304. At block 306, pending calls for the switchboard interface are identified. If calls are pending for the switchboard interface at decision block 308, pseudo-events are generated for the pending calls and communicated to the switchboard interface at block 310. The pseudo-events prompt the switchboard interface restore the status of the pending calls.

After communicating the pseudo-events at block 310, or if there are no pending calls at decision block 308, the process enters a subscription loop starting at decision block 312. If status of a pending call for the switchboard interface changes, decision block 312 directs the process to communicate a call event indicating the new status of a pending call to the switchboard interface at block 314. In some instances, the call may be pending for multiple switchboard interfaces. For example, the call may be parked in a queue shared by multiple receptionists. If a call is pending for multiple switchboard interfaces, the call event is communicated to each of the multiple switchboard interfaces at block 314. If a call control command is received decision block 316, the process performs the action indicated by the call control command at block 318. After performing the action, a call event indicating the new status of a pending call is communicated to the switchboard interface at block 314.

Figure 4:
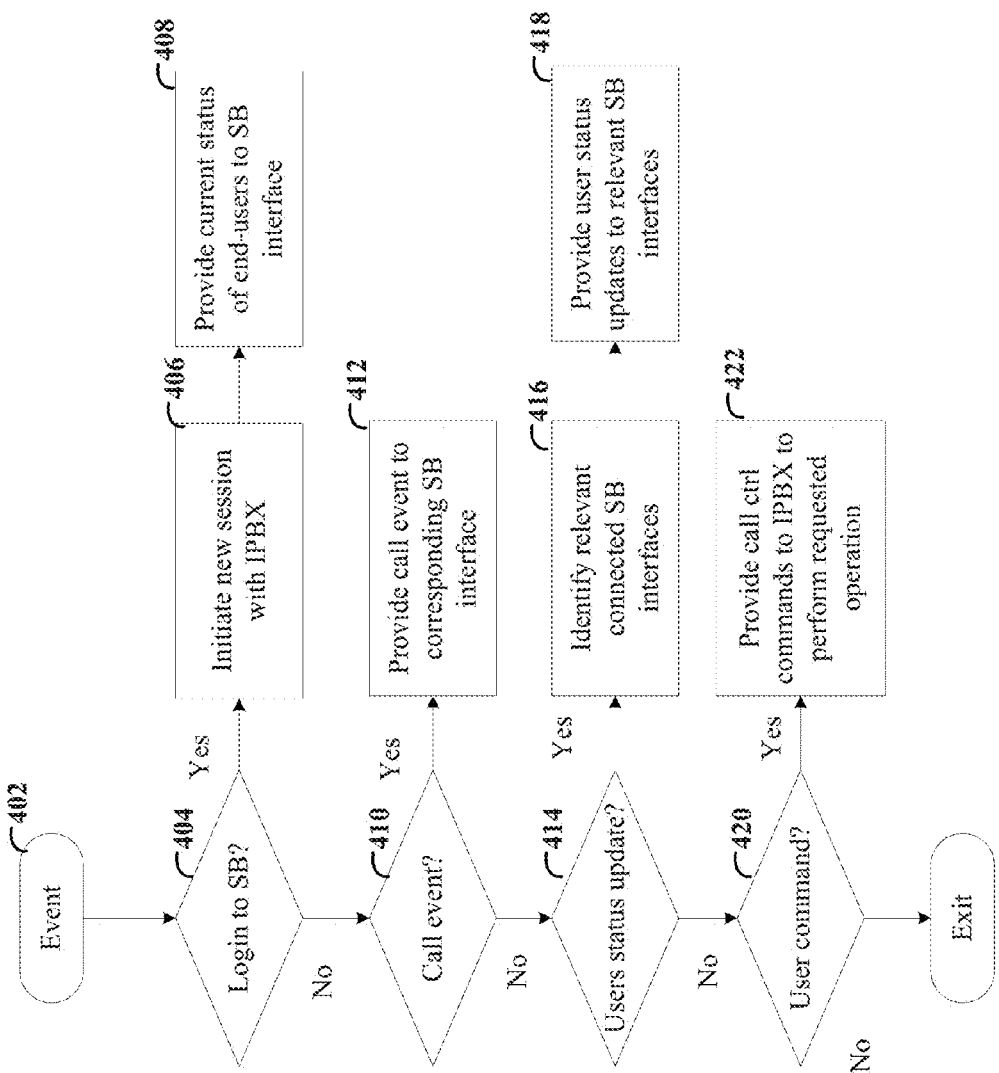
FIG. 4 shows an example process for providing a call-control subscription between an IPBX and a web-connected switchboard interface, consistent with one or more embodiments.

FIG. 4 shows an example process for providing a call-control subscription between an IPBX and a web-connected switchboard interface, consistent with one or more embodiments. The process is performed whenever an event 402 occurs. If the event is a receptionist logging into the switchboard at decision block 404, a new call subscription is initiated with the IPBX at block 406 and current status of end-users is provided to the switchboard interface at block 408.

Otherwise, the process proceeds to decision block 410. If the event is the reception of a call event is received from the IPBX, decision block 410 directs the process to provide the call event to switchboard interfaces for which the call is pending at block 412. Otherwise, the process proceeds to decision block 414. If the event is the receipt of an end-user status update, decision block 414 directs the process to identify switchboard interfaces having directories including the end-user at block 416. The status update is communicated to the identified switchboard interfaces at block 418. If the event is the receipt of a user command, decision block 420 directs the process to provide a corresponding call control command (e.g., CTI commands) to the IPBX to perform the requested operation at block 422.

Figure 5:
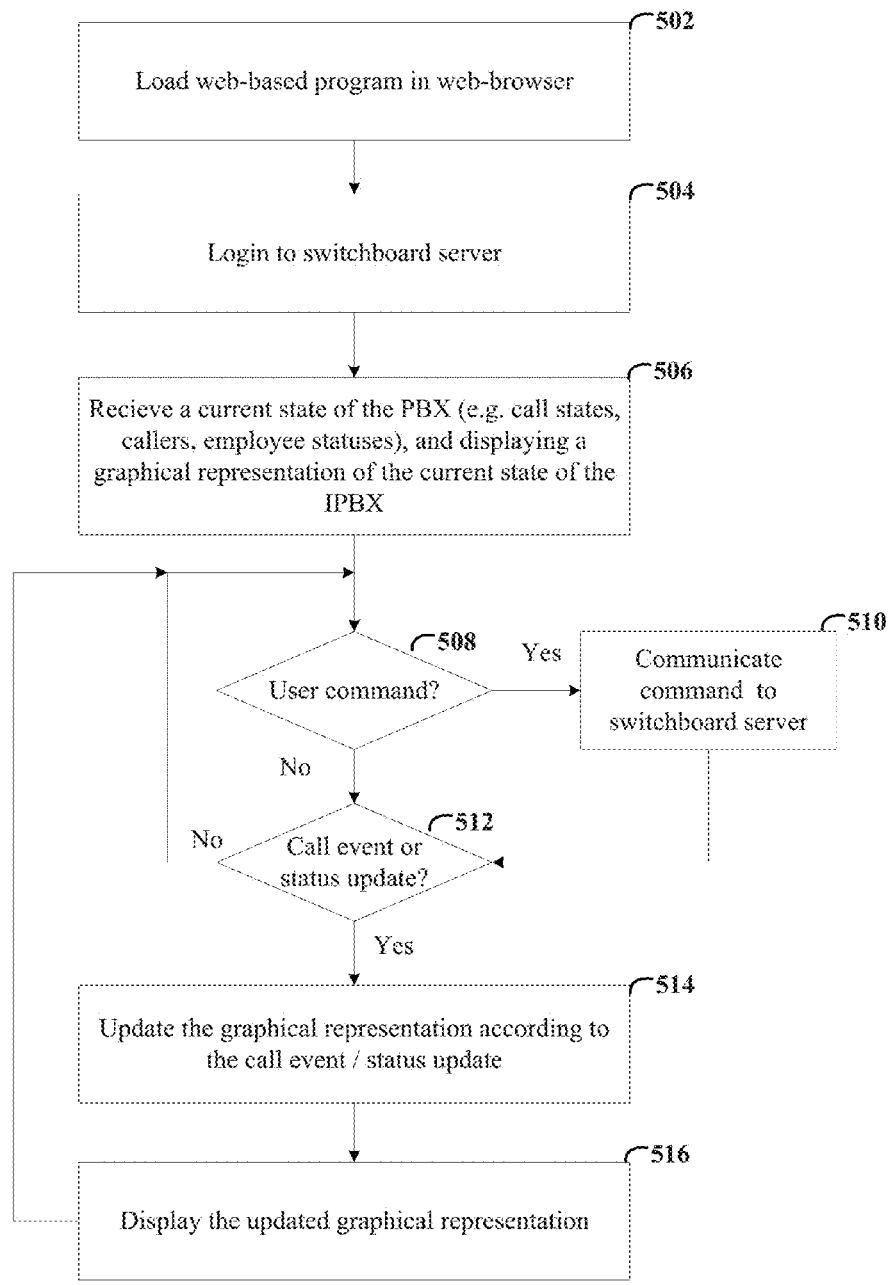
FIG. 5 shows an example process for providing call control interface using a web-connected switchboard interface, consistent with one or more embodiments.

FIG. 5 shows an example process for providing call control interface using a web-connected switchboard interface, consistent with one or more embodiments. At block 502 a switchboard interface is executed by a web-browser at block 502. A receptionist may cause the web-browser to execute the switchboard interface by directing the web-browser to a web-address of the switchboard server. At block 504, the receptionist logs into the switchboard server via the switchboard interface. As described with reference to FIGS. 3 and 4, when a receptionist logs into the switchboard server, the switchboard server and/or IPBX initiate a new call control subscription and communicate status data (e.g., a current state of users and/or pending calls) indicating the current state of the IPBX to the switchboard interface. At block 506, the status data is received and a graphical representation of the current state of the IPBX, including the status of any pending calls for the receptionist, is displayed.

Following block 506, the process then enters a process loop beginning at block 508. If a user command is input to the switchboard interface, decision block 508 directs the process to communicate the user command to the switchboard server at block 510. Otherwise, the process continues to decision block 512. If a status message (e.g., call event, user status update, and/or device connection update), decision block 512 directs the process to update the graphical representation of the IPBX at block 514 according to the status message. The update graphical representation is displayed at block 516 and the process returns to the start of the process loop at decision block 508. The process loop continues for the duration of the call control subscription.

Figure 6:
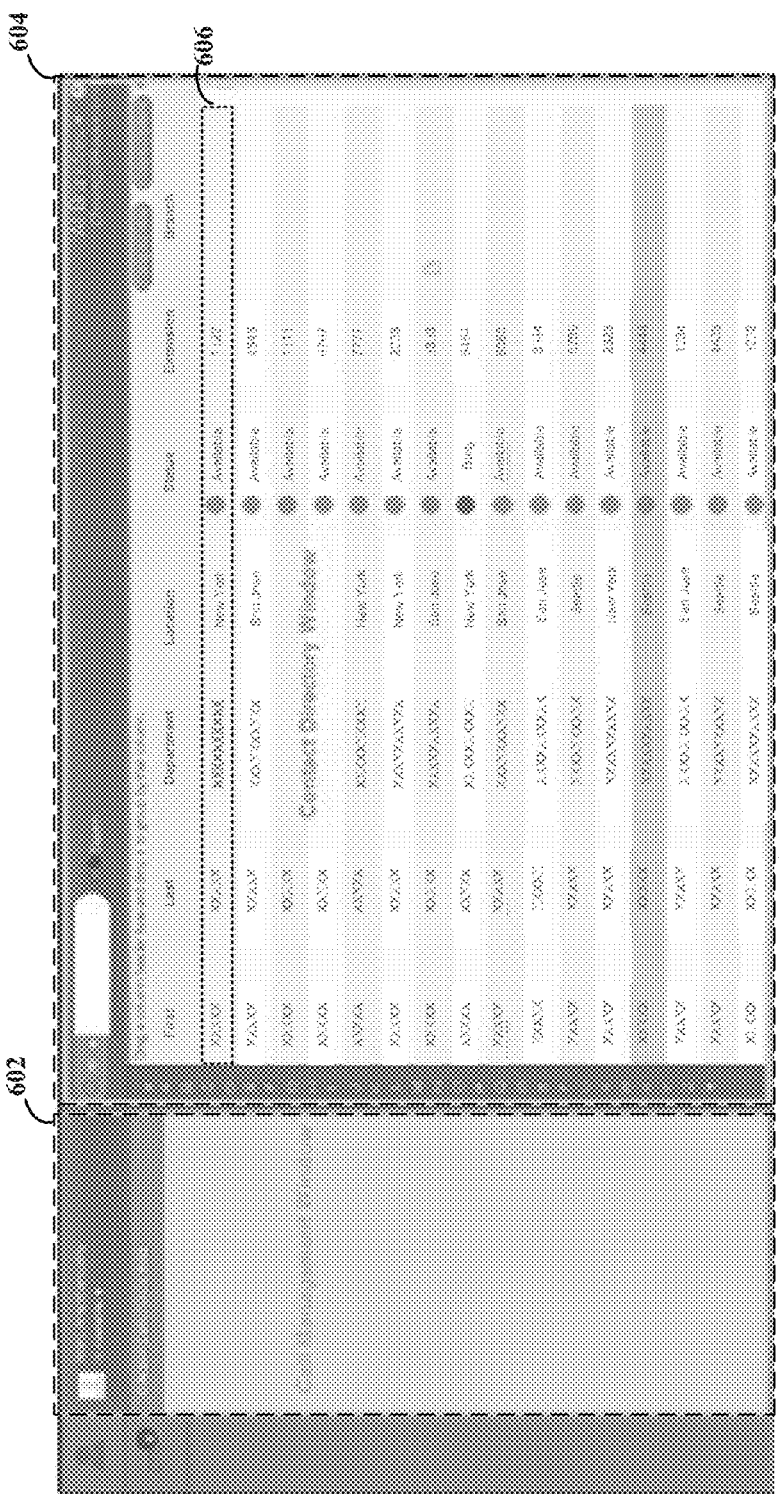
FIG. 6 shows an example graphical user interface (GUI) for a web-based switchboard interface, consistent with one or more embodiments.
Figure 7:
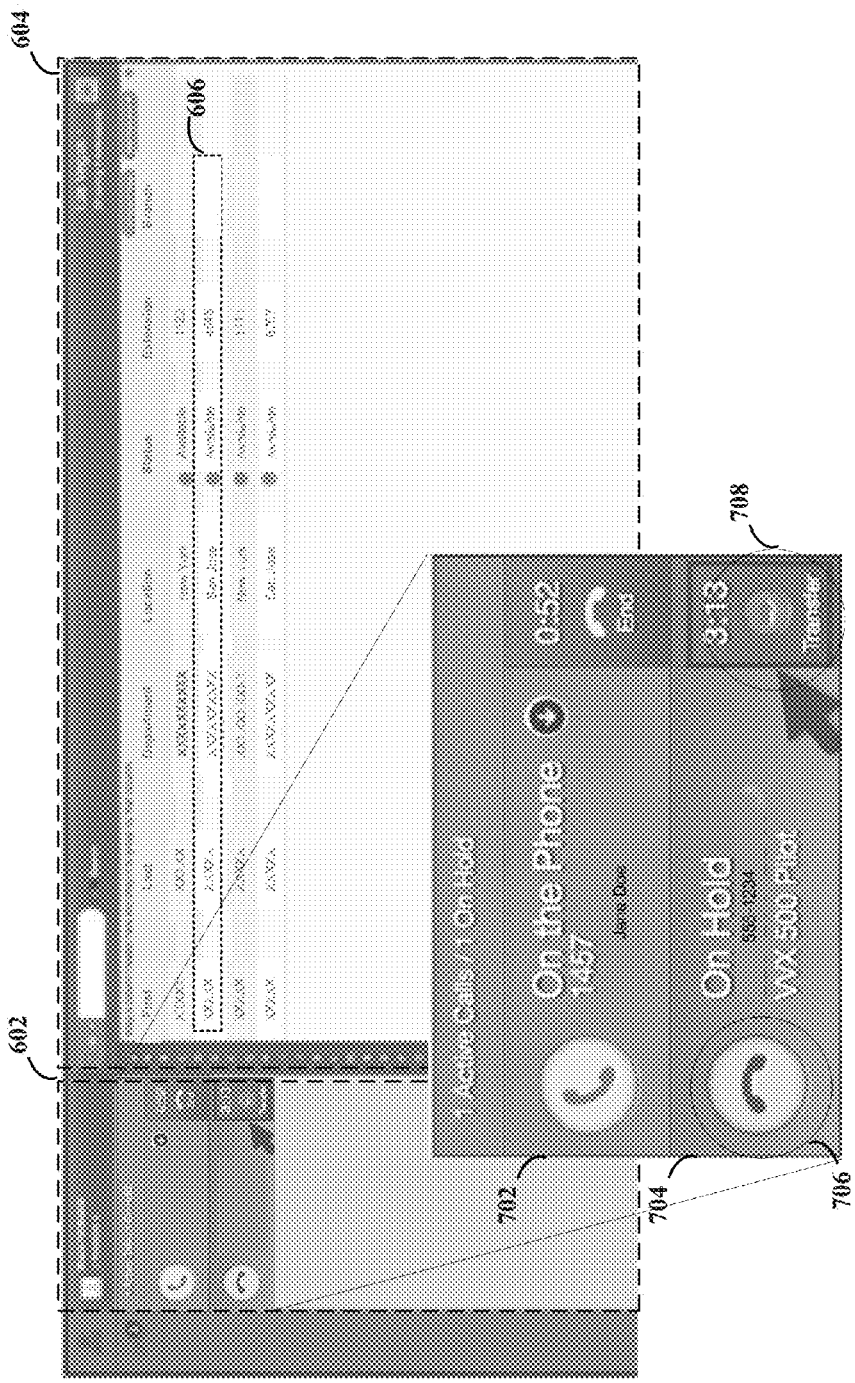
FIG. 7 shows the example GUI of FIG. 6 with two calls pending for the web-based switchboard interface, consistent with one or more embodiments.
Figure 8:
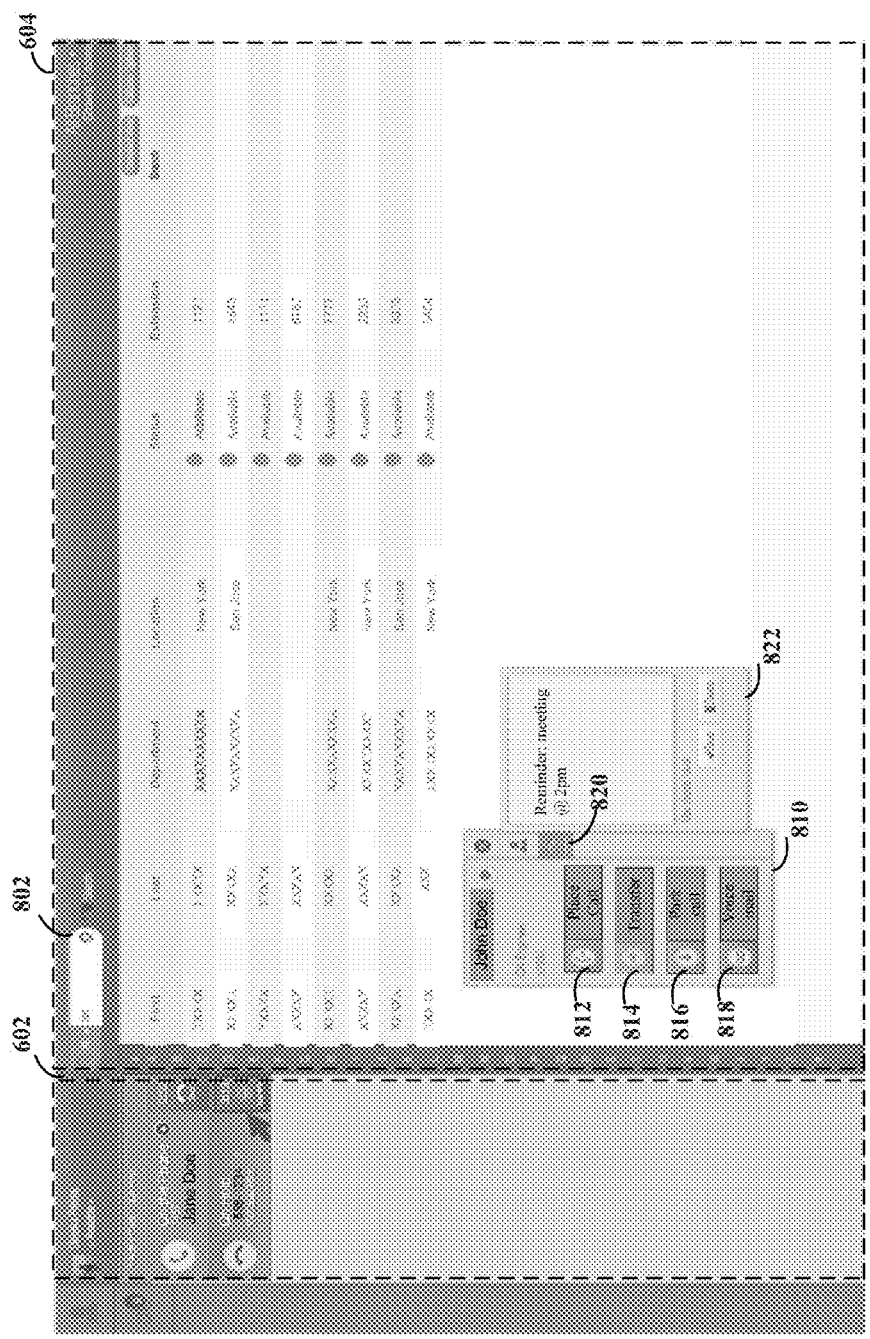
FIG. 8 shows the example GUI of FIG. 6 with a pop-up control menu for selection of actions for communicating with end-users in a directory.

FIGS. 6, 7, and 8 illustrate an example GUI provided by a switchboard interface for directing of calls in an IPBX. For ease of explanation, the same reference numerals may be used to refer to similar elements of the example GUI. FIG. 6 shows a first screenshot of the example GUI for the switchboard interface. In this example, includes a call management window 602 and a directory window 604. As discussed in more detail with reference to FIGS. 7 and 8, the call management window displays a status of pending calls routed to a receptionist by the IPBX and provides various call related actions for directing the call. In the example shown in FIG. 6 there are no pending calls for the receptionist displayed in the call management window 602.

When the switchboard interface logs into the switchboard server, info for end-users in a contact directory are provided to the switchboard interface and displayed in the directory window 604. For each individual end-user 606, the directory may display various user information including, for example, names, department, location, local time, extension, and/or user status. As previously described, during operation of the switchboard interface, presence events are communicated to the switchboard interface to indicate changes in statuses of the end-users. In response to receiving a presence event for an end-user, the switchboard interface updates the entry 606 for the end-user in the directory window 604. As described in more detail with reference to FIGS. 7, 8, and 9, receptionists may use the directory window during operation to select end-users to direct various communications.

FIG. 7 shows the example GUI of FIG. 6 with pending calls for a receptionist displayed in the call management window 602. In this example, two pending calls are displayed in the call management window 602. A first one of the pending calls 702 is active and a second one of the pending calls 704 is on hold. For each of the pending calls, one or more action buttons 706 and 708 are provided for a receptionist to trigger call-related options for the pending call. As indicated above, call related actions may include, for example, answer, hang up, put on hold, transfer, park, etc. In this example, one call related action is shown for each call. In some implementations, the receptionist may right click on an action button to display additional call-related options that may be available depending on the current status of the call. In some scenarios, a receptionist may perform a blind transfer or parking of a call, in which the switchboard server automatically determines an extension to transfer or park the call. In some other scenarios, a receptionist may perform call related actions to direct a call to a specific end-user.

FIG. 8 shows the example GUI of FIG. 6 with a pop-up control window 810 providing a number of possible actions for communicating with an end-user. A receptionist may initiate the pop-up control window 810 by, for example, right clicking on an end-user 606 shown in the directory window 604. The pop-up control window 810 includes action buttons 812, 814, 816, and 818 for a receptionist to perform various call-related actions. In this example, the action buttons include a first button 812 to initiate a new call from the receptionist to the selected end-user 606. This action may be useful for contacting an end-user regarding a call on hold to see if the end-user would like to take the call. A second button 814 in this example may be used to transfer a selected call from the call control menu 602 to the selected end-user 606 in the directory window 604. The third button 816 in this example may be used to park a selected call from the call control menu 602 and send a notification of the parked call to the selected end-user 606. The fourth button 818 in this example may be used to send a selected call from the call control menu 602 to a voicemail box of the selected end-user 606.

In some implementations, the pop-up control window 810 may include an action button 820 to initiate non-voice communication with a selected end-user 606. As previously described, non-voice communications may include, for example, SMS messages, instant messaging, memos, email. As an illustrative example, a memo interface 822 may appear in response to the user selecting action button 820. Using the interface, a receptionist may draft a memo to place in a memo box of the selected end-user 606.

In some embodiments, the directory window 604 includes a search interface 802 for searching user info of the displayed contracts for criteria matching a search term. The search interface may be useful for receptionists to locate end-users for specific departments, locations, etc. In some implementations, the GUI may also include an advance search interface that a receptionist to specify search terms for multiple field in the user data of the contacts. Simultaneous searching across multiple fields may be particularly useful for directories including a large number of contacts.

Figure 9:
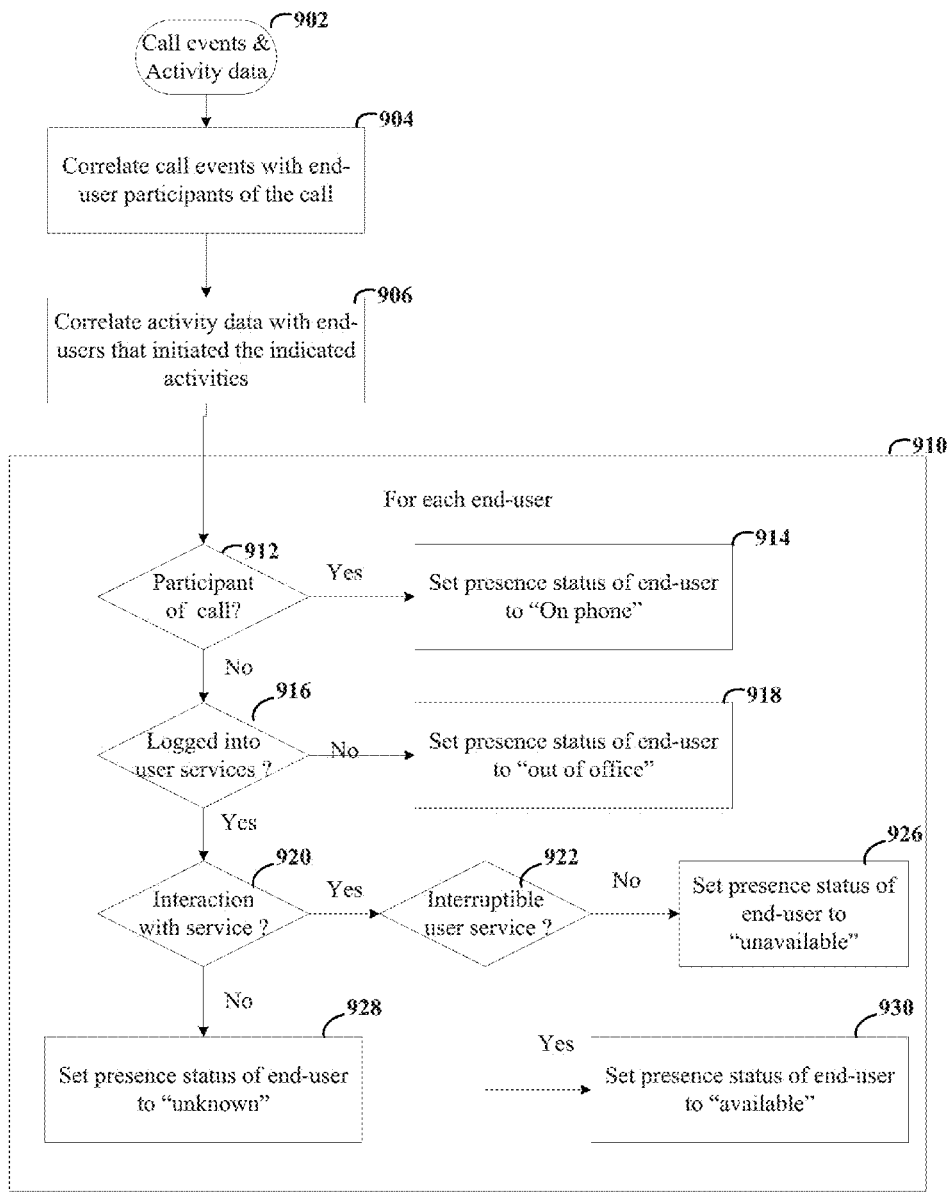
FIG. 9 shows an example process for determining presence statuses of end-users, consistent with one or more embodiments.

As previously described, in some embodiments a presence detection circuit is configured to determine presence statuses of end-users based on call-alerts for pending calls in the IPBX and/or based on activity data indicating activity of end-users in a software platform (or a "computing platform") that provides various services. FIG. 9 shows an example process for determining presence statuses of end-users, consistent with one or more embodiments. The process beings in response to the receiving call events from the IPBX and/or activity data from a software platform at block 902. At block 904, call events for a call are correlated with end-user participants in the call. At block 906 activity data is correlated with end-users that initiated activities indicated by the activity data.

At block 910, a presence status is determined for each end-user. If the end-user is a participant of a current call, decision block 912 directs the process to set a presence status of the end-user to "on phone" at block 914. Otherwise, if the end-user is not a participant in a current call, the process proceeds to decision block 916. In this example, if the end-user is not logged into any user services, it can be inferred that the user is not present in the office. At block 918, the process sets the presence status of the end-user to "out of office." If the end-user is logged into at least one user service, it may be inferred that the user is present somewhere in the office and the process proceeds to decision block 920. If a user is not currently interacting with the user services (e.g., active user input/response) at decision block 920, it is difficult to determine a presence status of an end-user. For instance, the end-user may be away from his/her desk or may be reviewing a paper document at their desk. If a user is not currently interacting with the user services, decision block 920 directs the process to set presence status of the end-user to "unknown" at block 928. If a user is currently interacting with the user services, the end-user may or may not be available to receive calls, depending on the service in use. For example, if the end-user is using an online conferencing service, the end-user likely is not available to receive phone calls. Conversely, if the end-user is using a word-processing service, the user may be interrupted to receive calls. At block 922, if the user is using an interruptible service, the process sets the presence status of the end-user to "available" at block 930. Otherwise, the process sets the presence status of the end-user to "unavailable" at block 926.

The presence statuses of end-users may be determined using various processes, which may use presence statuses different than those shown in FIG. 9. In some implementations, the process may use additional information, along with or in lieu of the call events and/or activity data, to determine presence statuses of the end-users. For example, in some implementations, an end-user may manually set the presence status for the end-user. Manually setting the presence status may override the presence status determination performed at block 910.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., a call control circuit). For example, in certain ones of the above-discussed embodiments, one or more modules are discrete logic circuits or programmable logic circuits configured and arranged for implementing these operations/activities, as in the blocks shown in FIGS. 1 and 2. Similarly, it will be apparent that a server (e.g., providing a corresponding software platform), includes a computer processing circuit that is configured to provide services to other circuit-based devices. Moreover, a VoIP-enabled circuit device includes processing circuits that are configured to establish VoIP communication sessions with other devices (e.g., personal computers, IP-enabled mobile phones, and tablet computers). In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a Central Processing Unit (CPU) hardware-based circuit and a set of instructions in the form of firmware, in which the first module includes a first CPU hardware circuit with one set of instructions and the second module includes a second CPU hardware circuit with another set of instructions. Certain embodiments are directed to a computer program product (e.g., nonvolatile memory device), which includes a machine or computer-readable medium having stored thereon, instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the invention, including aspects set forth in the claims.

What is claimed is:

1. An apparatus, comprising an internet-protocol private branch exchange (IPBX) server including:
    a call routing circuit configured and arranged to route calls for a plurality of switchboard interfaces, each switchboard interface corresponding to a Voice over Internet Protocol (VoIP)-enabled device of a respective receptionist; and
    a call control circuit coupled to the call routing circuit and configured and arranged to
        in response to a subscription request from one of the switchboard interfaces, initiate a new subscription for the switchboard interface;
        in response to a change in a status of a pending call of one of the plurality of switchboard interfaces having an active subscription, providing an event message indicating a status of the pending call to the switchboard interface; and
        in further response to the subscription request from one of the switchboard interfaces
            identify pending calls for the switchboard interface, wherein pending calls include active or previously requested calls for the respective receptionist; and
            for each of the pending calls, communicate a pseudo-event message indicating a current status of the pending call to the switchboard interface including historical data of the pending call, the historical data including data selected from the group consisting of: call transfer history length of call status, prior call status information, call parking information, and combinations thereof.

2. The apparatus of claim 1, further comprising a switchboard server communicatively coupled to the IPBX server and the plurality of switchboard interfaces and configured and arranged to for each of the plurality of switchboard interfaces,
    communicate event messages and pseudo-event messages indicating status of pending calls of the switchboard interface to the switchboard interface, where the pseudo-event messages include regenerated event messages of the pending calls; and
    communicate control commands for the pending calls to the IPBX server.

3. The apparatus of claim 2, wherein the switchboard server is further configured and arranged to:
    receive respective user-activity statuses of a plurality of end-users specified in a directory for the IPBX server; and
    in response to receiving a user-activity status of one end-user of the plurality of end-users, provide the user-activity status to one or more of the plurality of switchboard interfaces.

4. The apparatus of claim 3, wherein
    each of the plurality of switchboard interfaces has a respective contact list, and
    the switchboard server is configured to provide the user-activity status of the one end-user, to ones of the switchboard interfaces having the one end-user in the respective contact list.

5. The apparatus of claim 4, wherein for at least one of the plurality of switchboard interfaces, the respective contact list includes a set of public contacts that are included in each of the contact lists and includes a set of private contacts that are exclusive to the respective contact list.

6. The apparatus of claim 3, further comprising a user-activity detection circuit communicatively coupled to the IPBX server and configured and arranged to
    receive activity data indicating activity of the plurality of end-users in a virtual office environment,
    receive event messages, from the IPBX server, indicating statuses of pending calls in the IPBX server; and
    determine the respective user-activity statuses of the end-users based on received activity data and event messages.

7. The apparatus of claim 3, wherein each of the plurality of switchboard interfaces is configured to
    receive non-voice communications including short-message-service (SMS) messages, instant messages, electronic memos, email, or combinations thereof; and forward the non-voice communications to respective end-users included in the directory.

8. The apparatus of claim 3, wherein each of the plurality of switchboard interfaces is configured to
automatically answer incoming calls routed to the respective receptionist, when an auto-answer mode is enabled;
enable the auto-answer mode in response to a frequency of incoming calls to the receptionist being greater than a threshold frequency; and
disable the auto-answer mode in response to a frequency of incoming calls to the receptionist being less than the threshold frequency.

9. The apparatus of claim 2,
the switchboard sever includes a web server configured to provide a web-page configured to implement one of the switchboard interfaces when executed on a respective web-browser one of the receptionists;
the switchboard interface is configured and arranged to display a status of pending calls for the switchboard interface; and
the communicating of the pseudo-event messages for pending calls of the switchboard interface, by the call control circuit, restores statuses of pending calls displayed by the switchboard interface following reset by the web-browser.

10. The apparatus of claim 9, wherein the switchboard interface includes a graphical user interface (GUI) having a mechanism for selecting an action for a pending call for a switchboard interface, the action including answering the call, hanging up the call, placing the call on hold, sending the call to voicemail, forwarding the call to an end-user indicated in a directory, parking the call, or combinations thereof.

11. A method comprising:
routing, using a call routing circuit of an internet-protocol private branch exchange (IPBX) server, Voice over Internet Protocol (VoIP) calls for a plurality of switchboard interfaces, the switchboard interfaces corresponding to VoIP-enabled devices of a plurality of end-users and communicatively coupled to the IPBX via a circuit-based communications network;
initiating a new subscription, using a call control circuit coupled to the call routing circuit, for one of the switchboard interfaces in response to a subscription request from the switchboard interface;
providing, using the call control circuit, an event message indicating a status of a pending VoIP call to the switchboard interface in response to a change in a status of the pending VoIP call of one of the plurality of switchboard interfaces having an active subscription; and
in further response to the subscription request from one of the switchboard interfaces,
identifying a plurality of additional pending VoIP calls for the switchboard interface, wherein pending calls include active or previously requested calls; and
for each of the plurality of additional pending VoIP calls, communicating a pseudo-event message indicating a current status of the pending VoIP call to the switchboard interface, the pseudo-event message including historical data of the pending call, the historical data including data selected from the group consisting of: call transfer history, length of call status, prior call status information, call parking information, and combinations thereof.

12. The method of claim 11, wherein the switchboard interface corresponds to a respective VoIP-enabled device of a receptionist, and the method further includes:
displaying, using the switchboard interface, statuses of a plurality of end-users included in a directory of the IPBX server, wherein each of the plurality of switchboard interfaces has a respective contact list; and
providing an option for directing at least one of the pending VoIP calls for the switchboard interface to respective end-users in the respective contact list that are available to receive incoming calls based on user-activity statuses of the plurality of end-users.

13. The method claim 12, furthering including determining at least one of the plurality of end-users is not available to receive incoming VoIP calls in response to a user-activity status of at least one end-user including one of: on phone, out of office, and unknown.

14. The method of claim 12, wherein the statuses include user-activity statuses of the plurality of end-users, and wherein the method further includes:
receiving, at a user-activity detection circuit communicatively coupled to the IPBX server, user activity data indicating activity of the plurality of end-users; and
determining, by the user-activity detection circuit, respective user-activity statuses of the plurality of end-users based on the received activity data and a plurality of event messages; and
providing, using a computing server communicatively coupled to the user-activity detection circuit, the determined respective user-activity statuses to the switchboard interface.

15. The method of claim 11, furthering including:
communicating event messages and pseudo-event messages, using a switchboard server communicatively coupled to the IPBX server and the plurality of switchboard interfaces, indicating status of pending VoIP calls of the switchboard interface to the switchboard interface; and
communicating, using the switchboard server, control commands for the pending VoIP calls to the IPBX server.

16. The method of claim 11, furthering including:
identifying nodes in the subscription request;
checking for call statuses for the identified nodes; and
generating the pseudo-event message indicating the status of the pending VoIP call in response to nodes identified in the subscription request and the call status.

17. The method of claim 11, wherein the switchboard interface correspond to a respective VoIP-enabled device of a receptionist, the method further including:
enabling an auto-answer mode based on a status of the respective receptionist; and
automatically answering an incoming VoIP call routed to the switchboard interface in response to the enabled auto-answer mode.

18. The method of claim 11, wherein at least one of the pending VoIP calls is pending for at least two of the plurality of switchboard interfaces, the method furthering including:
placing the respective pending VoIP call in a queue shared by the at least two switchboard interfaces; and
communicating the call event for the respective pending VoIP call to each of the at least two switchboard interfaces.

19. The method of claim 11, furthering including:
providing a web-page, using a web server, configured and arranged to implement the switchboard interface when executed on a respective web-browser an end-device;

displaying a status of pending VoIP calls for the switchboard interface; and wherein communicating of the pseudo-event messages indicating a status of the pending VoIP calls to the switchboard interface further includes restoring statuses of pending calls displayed by the switchboard interface following reset by the web-browser.

20. The method of claim 18, further including providing, using the switchboard interface, a graphical user interface (GUI) configured and arranged to provide a list of actions for a pending VoIP call for the switchboard interface to the respective end-user, the actions including answering the call, hanging up the call, placing the VoIP call on hold, sending the call to voicemail, forwarding the call to an end-user indicated in a directory, parking the call, or combinations thereof.

\* \* \* \* \*